(No Model.)
V. H. ERNST.
SECONDARY BATTERY PLATE.
No. 417,158. Patented Dec. 10, 1889.
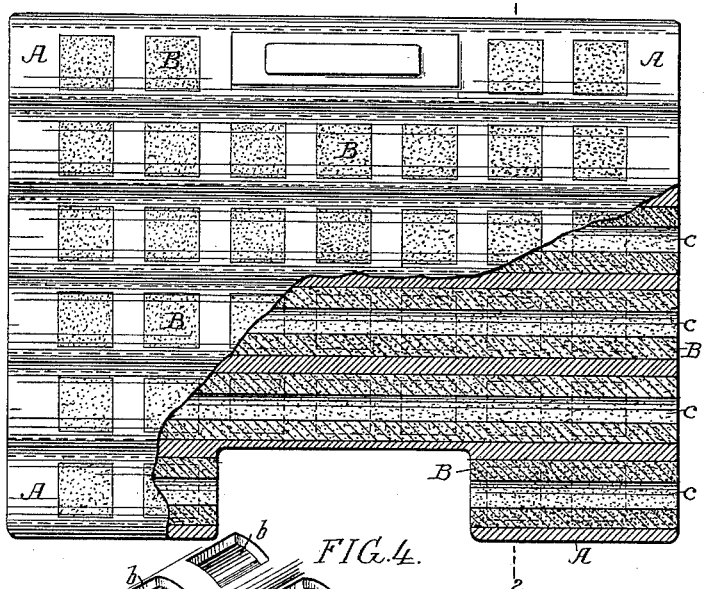
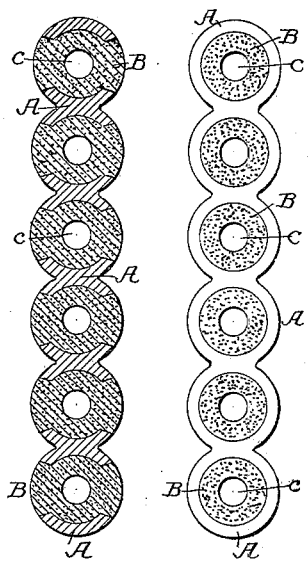
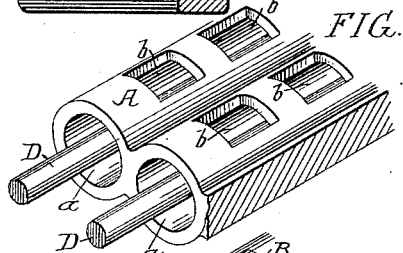
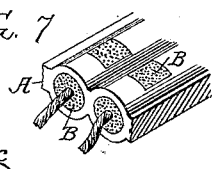
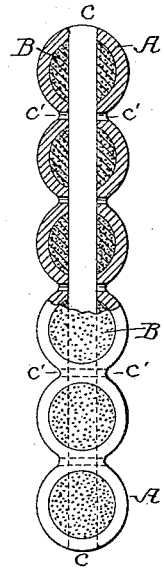
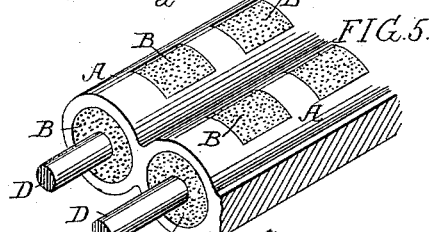
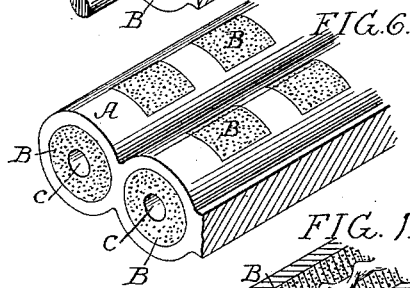
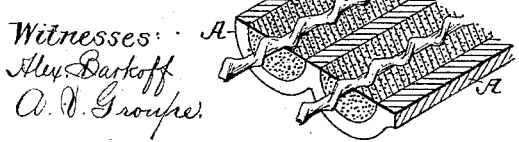
Witnesses:
Aley Darkoff
A. V. Groupe
Inventor:
Victor H. Ernst
by his Attorneys
Howson & Howson

UNITED STATES PATENT OFFICE.

VICTOR H. ERNST, OF JERSEY CITY, NEW JERSEY.

SECONDARY-BATTERY PLATE.

SPECIFICATION forming part of Letters Patent No. 417,158, dated December 10, 1889.

Application filed September 28, 1889. Serial No. 325,344. (No model.)

*To all whom it may concern:*

Be it known that I, VICTOR H. ERNST, a citizen of the United States, and a resident of Jersey City, Hudson county, New Jersey, have invented certain Improvements in Secondary-Battery Plates, of which the following is a specification.

The object of my invention is to increase the exposed surface of active material in a plate of a storage or secondary battery. This object I attain in the following manner, reference being had to the accompanying drawings, in which—

Figure 1 is a face view, partly in section, of a storage-battery plate with my improvements. Fig. 2 is an edge view of Fig. 1. Fig. 3 is a transverse sectional view of Fig. 1. Figs. 4, 5, and 6 are diagrams illustrating the method of carrying out my invention. Fig. 7 is a view showing the core of material that will be destroyed by the acid of the battery, and Figs. 8, 9, 10, and 11 are views showing modifications of my invention.

A is the shell or housing, made in the manner shown clearly in Fig. 4. This shell has a series of longitudinal openings $a$ throughout its entire length, and a series of transverse openings $b$, connecting with the openings $a$. The openings $b$ preferably extend from side to side of the plate, as shown in Fig. 3; but in some instances they may extend only part way through the plate.

The active material B is placed in the cavities formed by the openings $a$ and $b$, and a central passage $c$ is formed in each bar of active material, running parallel with the openings $a$, and preferably in the center of the material, as shown in Fig. 2. By this construction a great percentage of active material is exposed to the action of the acid of the battery without decreasing the actual surface exposure, and the wall of the passages $c$ being circular the active material does not present an edge to the acid except at each end of the battery-plate.

The plate is filled in the following manner: After the plate A is cast or otherwise formed rods or cores D are placed in each longitudinal orifice $a$, preferably centrally situated therein, as in Fig. 4. These cores I prefer to taper slightly, so they can be readily removed when the active material is set. When the active material is placed in the plate and around the cores, as shown in Fig. 5, it is allowed to set, after which the cores are removed, leaving the battery-plate with a series of longitudinal openings, as shown in Fig. 6, through which the acid of the battery may gain access to the interior of the active material.

The core may be made of metal or wood or other material which can be readily removed, or may be made of some material that will be destroyed by acid or burning after the active material is set. In Fig. 7 I have shown cotton fiber used as a core, which will be eaten away and destroyed by the acid of the battery.

The cores can be of any shape, depending mostly upon the contour of the longitudinal openings in the plate. In some instances the passages $c$ may be at right angles to both openings $a$ and $b$, as shown in Fig. 8, the result being the same as in the construction shown in Fig. 1 as regards the surface exposed; but this construction of plate is more difficult to make than that shown in Fig. 1. The active material may be a series of independent balls, disks, or slabs, and the longitudinal passages $c$ formed therein, as shown in Figs. 9 and 10. The longitudinal passages $c$ can be connected to one or more transverse passages $c'$, Figs. 8 and 9, passing through to the surface in order to obtain better circulation of the acid around the active material.

In Fig. 11 I have shown an irregular core, zigzag in form, made in the present instance of cotton fiber or other material that can be removed by the action of acid or by burning. The openings through the interior of the plate not only serve to expose more of the active material to the action of the acid, but also allow the active material to cool to a certain extent, owing to the circulation of the acid through the openings, and this circulation keeps the acid in a more uniform state.

I claim as my invention—

1. A battery-plate having the active material embedded therein, with a passage in the interior of said active material extending parallel with the surface of the plate, whereby the acid of the battery can gain access to the interior of said active material, substantially as specified.

2. A storage-battery plate having longitudinal and transverse openings, active material in said openings, with central passages in the active material confined in the longitudinal openings, substantially as described.

In testimony whereof I have signed my name to this specification in the presence of two subscribing witnesses.

VICTOR H. ERNST.

Witnesses:
WILLIAM D. CONNER,
HENRY HOWSON.